(12) United States Patent
Stanggren

(10) Patent No.: US 10,625,799 B2
(45) Date of Patent: Apr. 21, 2020

(54) CHECKING FIXTURE

(71) Applicant: Volvo Car Corporation, Gothenburg (SE)

(72) Inventor: Ulf Stanggren, Olofstrom (SE)

(73) Assignee: Volvo Car Corporation, Gothenburg (SE)

( * ) Notice: Subject to any disclaimer, the term of this patent is extended or adjusted under 35 U.S.C. 154(b) by 280 days.

(21) Appl. No.: 15/915,590

(22) Filed: Mar. 8, 2018

(65) Prior Publication Data

US 2018/0265148 A1 Sep. 20, 2018

(30) Foreign Application Priority Data

Mar. 15, 2017 (EP) ..................................... 17161094

(51) Int. Cl.
| | |
|---|---|
| *B62D 65/00* | (2006.01) |
| *G01B 5/00* | (2006.01) |
| *B23K 26/40* | (2014.01) |
| *G01B 5/207* | (2006.01) |
| *B23K 31/02* | (2006.01) |
| *B23K 26/38* | (2014.01) |
| *B23K 101/20* | (2006.01) |

(Continued)

(52) U.S. Cl.
CPC ............ *B62D 65/005* (2013.01); *B23K 26/38* (2013.01); *B23K 26/40* (2013.01); *B23K 31/02* (2013.01); *G01B 5/0004* (2013.01); *G01B 5/0025* (2013.01); *G01B 5/207* (2013.01); *B23K 2101/20* (2018.08); *B23K 2101/24* (2018.08); *B23K 2103/04* (2018.08); *B23K 2103/05* (2018.08); *B60Y 2304/09* (2013.01)

(58) Field of Classification Search
CPC ..... B62D 65/005; G01B 5/0025; G01B 5/207
USPC ........................................................... 33/551
See application file for complete search history.

(56) References Cited

U.S. PATENT DOCUMENTS 4,023,394 A * 5/1977 Borup ...................... B21D 1/14
72/457
4,251,922 A * 2/1981 Perlotto ............. B23Q 17/2225
33/1 M (Continued)

FOREIGN PATENT DOCUMENTS

| CN | 104191131 A | 12/2014 |
|---|---|---|
| WO | 2006129230 A1 | 12/2006 |

*Primary Examiner* — Christopher W Fulton
(74) *Attorney, Agent, or Firm* — Synder, Clark, Lesch & Chung, LLP

(57) ABSTRACT

The present invention relates to a checking fixture comprising: a bottom support frame; a metallic support sheet mechanically fixated to the bottom support frame, the metallic support sheet comprising a plurality of through holes arranged in a predetermined layout; a plurality of holder members for holding vehicle component holders or vehicle component measurement devices, the holder members being attached to the metallic support sheet in the through holes and being adapted to extend away from an upper surface of the metallic support sheet; at least one metallic sheet reinforcement structure arranged orthogonally separated from the metallic support sheet, the metallic sheet reinforcement structure being adapted to fixate the relative position of at least two of the holders members. The metallic support sheet and the metallic reinforcement sheet structure are made from laser cut sheet material.

15 Claims, 7 Drawing Sheets

(51) Int. Cl.
*B23K 101/24* (2006.01)
*B23K 103/04* (2006.01)

(56) References Cited

U.S. PATENT DOCUMENTS

| | | | | |
|---|---|---|---|---|
| 4,593,476 | A * | 6/1986 | Clark | G01B 5/207 33/529 |
| 5,107,599 | A | 4/1992 | Marincic et al. | |
| 5,193,286 | A * | 3/1993 | Collier | G01B 5/0002 33/1 M |
| 5,208,995 | A * | 5/1993 | McKendrick | G01B 3/14 33/567 |
| 5,412,877 | A | 5/1995 | McKendrik | |
| 5,625,959 | A * | 5/1997 | Ercole | G01B 5/0002 33/568 |
| 5,883,313 | A | 3/1999 | Ercole et al. | |
| 6,298,572 | B1 * | 10/2001 | McAuley | G01B 5/0002 269/37 |
| 6,460,264 | B1 * | 10/2002 | Bos | G01B 5/0004 33/549 |
| 7,103,985 | B1 * | 9/2006 | Phillips | G01B 3/14 33/549 |
| 2006/0026852 | A1 * | 2/2006 | Kikuti | G01B 21/042 33/551 |
| 2007/0261259 | A1 * | 11/2007 | Eaton | G01B 5/0016 33/551 |
| 2008/0201974 | A1 * | 8/2008 | Kato | G01B 5/0025 33/551 |

\* cited by examiner

CHECKING FIXTURE

CROSS-REFERENCE TO RELATED APPLICATION

This application claims priority under 35 U.S.C. § 119 based on European Patent Application No. 17161094.2, filed Mar. 15, 2017, the disclosure of which is hereby incorporated by reference herein.

FIELD OF THE INVENTION

The present invention relates to a checking fixture for inspecting vehicle components and to a method for manufacturing such a checking fixture.

BACKGROUND OF THE INVENTION

Checking fixtures in the automotive industry are generally used for inspecting the shape and measures of vehicle components. Checking fixtures are particularly useful for inspecting vehicle components having complex shapes. For a vehicle component inspection, the vehicle component is fixated in the checking fixture by holders arranged at specific locations in the checking fixture. Once the vehicle component is fixated, measurement devices are used for determining measures in predetermined directions and locations of the vehicle component.

Checking fixtures are generally manufactured with relatively high precision and a common manufacturing method for producing checking fixtures is to use a milling technique starting from a large block of e.g. a composite material or a plastic material. Furthermore, for every vehicle component that requires high precision inspection, a new checking fixture specifically designed for that vehicle component has to be designed and manufactured. However, using milling requires relatively expensive and unnecessarily complicated milling machines. Furthermore, the lead time for manufacturing a checking fixture using a milling machine tends to be relatively long.

Accordingly, there is a need for a checking fixture which can be manufacture in a simpler and faster way.

SUMMARY

In view of above, it is an object of the present invention to provide a checking fixture which may be produced by simple means. In particular, an object of the invention is to provide a checking fixture which can be produced without the need for a milling machine.

According to a first aspect of the invention, there is provided a checking fixture for inspecting vehicle components for a vehicle, the fixture arrangement comprising: a bottom support frame; a metallic support sheet mechanically fixated to the bottom support frame, the metallic support sheet comprising a plurality of through holes arranged in a predetermined layout; a plurality of holder members for holding vehicle component holders or vehicle component measurement devices, the holder members being attached to the metallic support sheet in the through holes and being adapted to extend away from an upper surface of the metallic support sheet; at least one metallic sheet reinforcement structure arranged orthogonally separated from the metallic support sheet, the metallic sheet reinforcement structure being adapted to fixate the relative position of at least two of the holders members, wherein, the metallic support sheet and the metallic reinforcement sheet structure are made from laser cut sheet material.

The present invention is based on the realization that by using laser cutting for producing parts of the checking fixtures a simpler way of manufacturing a checking fixture is provided. By the provision of using laser cutting, a metallic support sheet may be produced with defined holes for the placement of holder members. The metallic support sheet produced by laser cutting provides a versatile platform for attaching the holder members without the need for complicated and expensive milling techniques. Furthermore, the metallic sheet reinforcement structure advantageously produced by laser cutting provides reinforcement for the holder members such that their relative positions are maintained, thus providing stabilized holder members for holding e.g. the vehicle component holders and measurement devices.

A "sheet" should be interpreted as a mainly plate like structure with a main extension in a plane. Thus, the "sheet" thickness is relatively small in a direction orthogonal to the plane compared to the dimension of the sheet in the plane.

Laser cut materials or parts are produced by a laser cutting device which operates by focusing a laser beam onto the material to thereby cut through the material. As the laser beam hits the material, the cutting may be produced by the laser melting the material. Laser cutting allows for highly versatile designs since the cutting can be made in nearly arbitrary patterns and with high precision. A laser cutting machine may comprise a motion control system which can be loaded with data specifying the pattern to be cut. For example, the layout of the metallic sheet reinforcement structure may be loaded into a laser cutting device based on a CAD-drawing (computer aided design drawing), or similar to provide a CNC or G-code for the motion control system of a laser cutting device to follow. Laser cutting is known as such to the skilled person in the art.

The checking fixture may comprise corner reinforcement members arranged in outer corners of the bottom support frame for mechanically reinforcing the bottom support frame, the corner reinforcement members comprising mounting holes, wherein the metallic support sheet is mechanically fixated to the bottom support frame at the mounting holes of the corner reinforcement members. The corner reinforcement members provide reinforcement for the corners of the bottom support frame where welding joints may be applied to join the bottom support frame parts (e.g. metallic beams). Furthermore, the corner reinforcement members advantageously provide mounting holes for the support sheet to thereby guide the metallic support sheet to the correct mounting location on the bottom support frame.

Advantageously, the corner reinforcement members are fixated to the bottom support frame by means of welding. Such welding may for example be TIG-welding (Tungsten inert gas) known in the art.

The holder members may each comprises a pipe which is attached at a respective through hole of the metallic support sheet. The holder members may be attached to the metallic support sheet by welding either directly to the pipes or via an add-on part which provides a rotational connection of the holder member to the metallic support sheet.

The bottom support frame may comprise a plurality of metallic beams which are welded together to form the frame. The main function of the bottom frame is to support the weight of the checking fixture and to provide a stable support.

Furthermore, the metallic sheet reinforcement structure may be welded to the holder members. Hereby, a stronger reinforcement for maintaining the relative position of the holder members is provided compared to e.g. bolting or gluing etc.

The metallic sheet reinforcement structure may comprise through-holes, wherein each holder member is arranged in a respective through-hole of a metallic sheet reinforcement structure. Hereby, a rigid and accurate way is provided for fixating the positions of the holders members with the metallic sheet reinforcement structure.

According to a second aspect of the invention, there is provided a method for manufacturing a checking fixture adapted for inspecting vehicle components for a vehicle, the method comprising: providing a bottom support frame; mechanically fixating a laser cut metallic support sheet to the bottom support frame, the metallic support sheet comprising a plurality of through holes arranged in a predetermined layout; attaching a plurality of holder members for holding vehicle component holders or vehicle component measurement devices to the metallic support sheet in the through holes such that the holder members extends away from an upper surface of the metallic support sheet; mechanically fixating a laser cut metallic sheet reinforcement structure to at least two holder members for fixating the relative positions of the at least two holder members.

The method may further comprise attaching corner reinforcing members to outer corners of the bottom support frame.

In addition, the metallic support sheet may be mechanically fixated to the corner reinforcement members.

Advantageously, it may be included in the method to laser cut a first metallic sheet to form the metallic support sheet.

Alternatively or additionally, a second metallic sheet may be laser cut to form the metallic sheet reinforcement structure. Naturally the first and the second metallic sheet may originate from the same metallic sheet.

The first metallic sheet and the second metallic sheet are preferably made from steel such as e.g. stainless steel.

The metallic sheet reinforcement structure may comprise through-holes, wherein the method may comprise: arranging the holder members in a respective though-hole of a metallic sheet reinforcement structure to fixate the relative positions of the holder members.

In summary, the present invention relates to a checking fixture comprising: a bottom support frame; a metallic support sheet mechanically fixated to the bottom support frame, the metallic support sheet comprising a plurality of through holes arranged in a predetermined layout; a plurality of holder members for holding vehicle component holders or vehicle component measurement devices, the holder members being attached to the metallic support sheet in the through holes and being adapted to extend away from an upper surface of the metallic support sheet; at least one metallic sheet reinforcement structure arranged orthogonally separated from the metallic support sheet, the metallic sheet reinforcement structure being adapted to fixate the relative position of at least two of the holders members. The metallic support sheet and the metallic reinforcement sheet structure are made from laser cut sheet material.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EXAMPLE EMBODIMENTS

Figure 1:
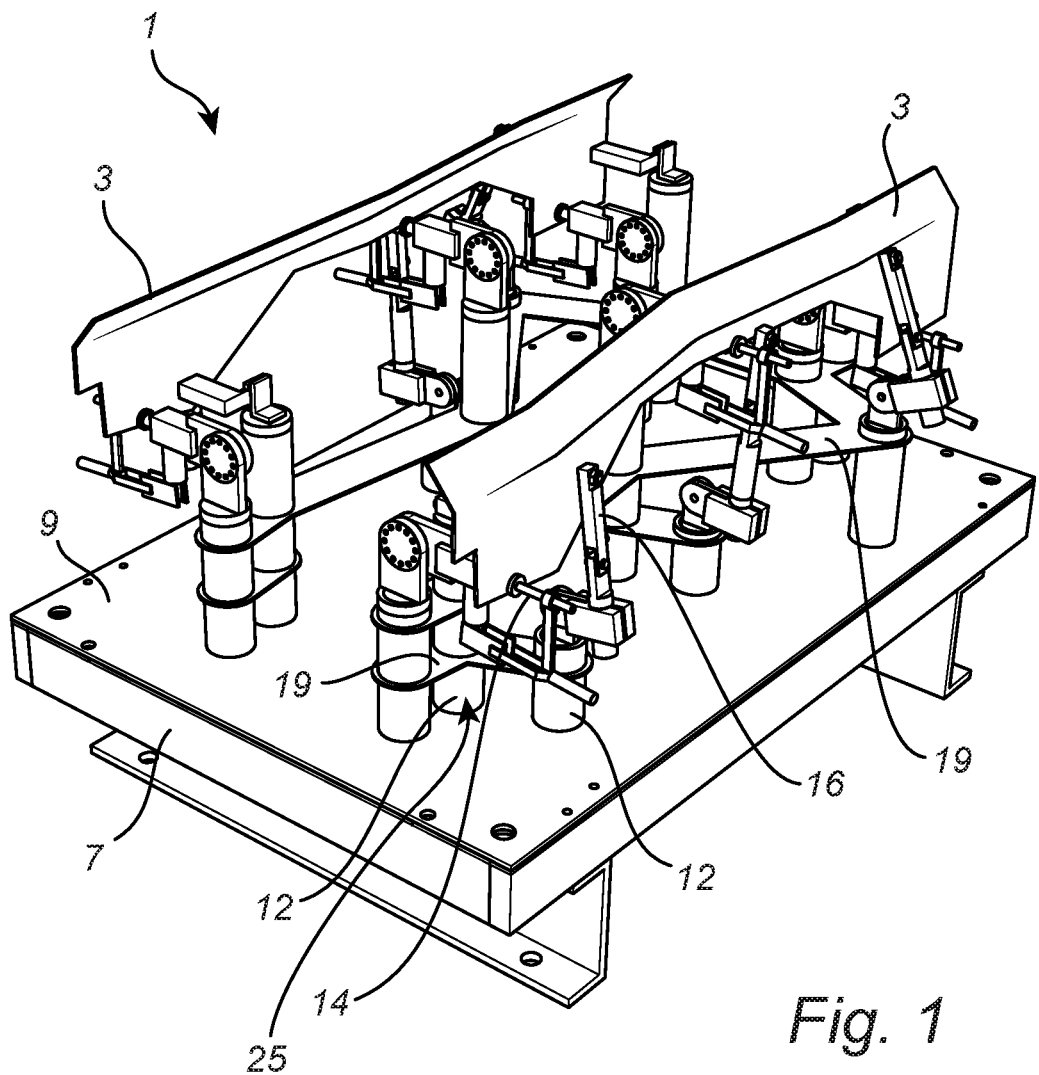
FIG. 1 conceptually illustrates an exemplary embodiment of a checking fixture.

This invention may be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1 shows an exemplary checking fixture 1 according to embodiments of the invention. The checking fixture 1 is shown to hold vehicle components 3 in the form of a metallic component for the vehicle. It should be noted that a wide variety of vehicle components (armrests, vehicle frame parts, beams, seat parts, bumpers, lights, etc.) may be inspected in a checking fixture, such as metallic or plastic sheet articles, and even fabric articles for the vehicle. The vehicle components 3 in FIG. 1 are exemplified by a metallic frame part 3. The vehicle components 3 are held in place by a plurality of vehicle component holders in the form of clamping devices 14 (only one is numbered). The ve hicle components 3 are being inspected by vehicle components measurement devices 16 (only one is numbered). Such measurement devices are generally used for measuring various dimensions and measures of the vehicle component 3. The vehicle components measurement devices 16 and the vehicle component holders 14 are held in place by holder members 12 (only two are numbered).

With further reference to FIG. 1, a bottom support frame 7 is arranged to provide a stable support for the checking fixture 1. The bottom support frame 7 will be further described with reference to FIG. 2. A metallic support sheet 9 is arranged on the bottom support frame 7. The metallic support sheet 9 may be bolted to the bottom support frame 7. Furthermore, the metallic support sheet 9 comprises a plurality of through-holes (see FIG. 3) at which the holder members 12 are attached. Thus, the layout of the through-holes provides the mounting positions for the holders members 12. The holder members 12 may each comprise a pipe 25 which is attached directly or indirectly in a through-hole of the metallic sheet structure 9. The holder members 12 may be directly attached to the metallic support sheet in the through-holes, or they may be attached via a bushing (not shown). The metallic sheet structure 9 is made by laser cutting a metallic sheet by laser cutting means. In this particular example embodiment, the outer dimensions of the metallic support sheet 9 are similar to the outer dimensions of the bottom support frame 7. Thus, at least the outer beams of the bottom support frame support the metallic support sheet 9.

In order to reinforce the holder members 12 and to ensure that they maintain their relative positions, metallic sheet reinforcement structures 19 are arranged to be attached between holder members 12. The metallic sheet reinforcement structure 19 may be welded to the holder members 12 at the intersections between the metallic sheet reinforcement structure 19 and the respective holder member 12. The holder members 12 may be arranged in through-holes of the metallic sheet reinforcement structure 19. The metallic sheet reinforcement structure 19 is made by laser cutting a metallic sheet.

The metallic support sheet 9 and the metallic sheet reinforcement structure 19 are preferably made from steel such as e.g. stainless steel.

Figure 2:
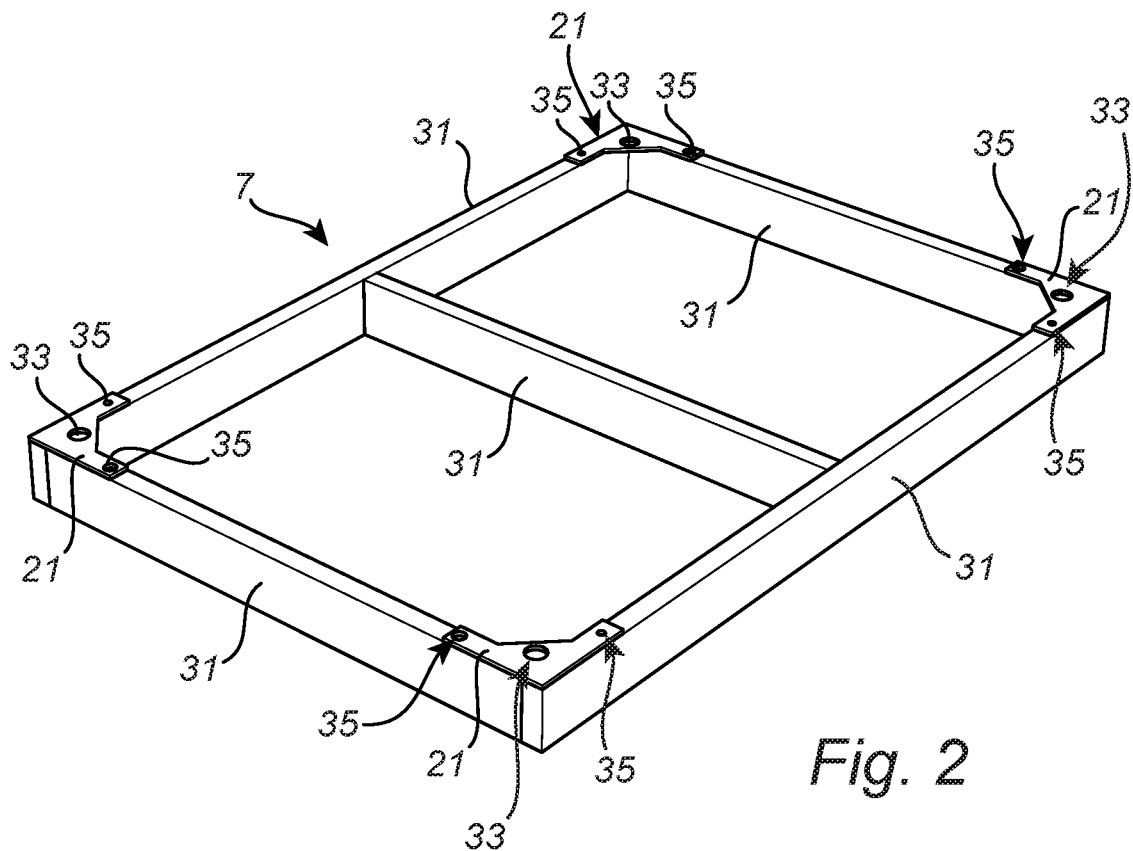
FIG. 2 conceptually illustrates a bottom support frame.

FIG. 2 illustrates an exemplary bottom support frame 7 and corner reinforcement members 21. The bottom support frame 7 is constructed from a plurality of beams 31 having a hollow profile. The beams 31 are welded (e.g. TIG-welding) or bolted together to form a stable support frame for supporting the metallic support sheet on one of its sides (i.e. the sides of the bottom support frame 7). Preferably, the beams 31 are fixated to each other such that one side is substantially flush to provide a stable support for the metallic support sheet 9. Optionally, corner reinforcement members 21 are arranged to reinforce the outer corners of the bottom support frame 7. The corner reinforcement members 21 may be made by laser cutting a metallic sheet having thickness of e.g. 3 mm, 4 mm, 5 mm, or 6 mm, etc. Each of the corner reinforcement members 21 may have a through-hole 33 for guiding the metallic support sheet 9 into the right position on the bottom support frame 7. The through-hole 33 may also serve as a mounting hole 33 for the metallic support sheet 9. A further through-hole 35 may be used for a lifting device for lifting the checking fixture 1.

Figure 3:
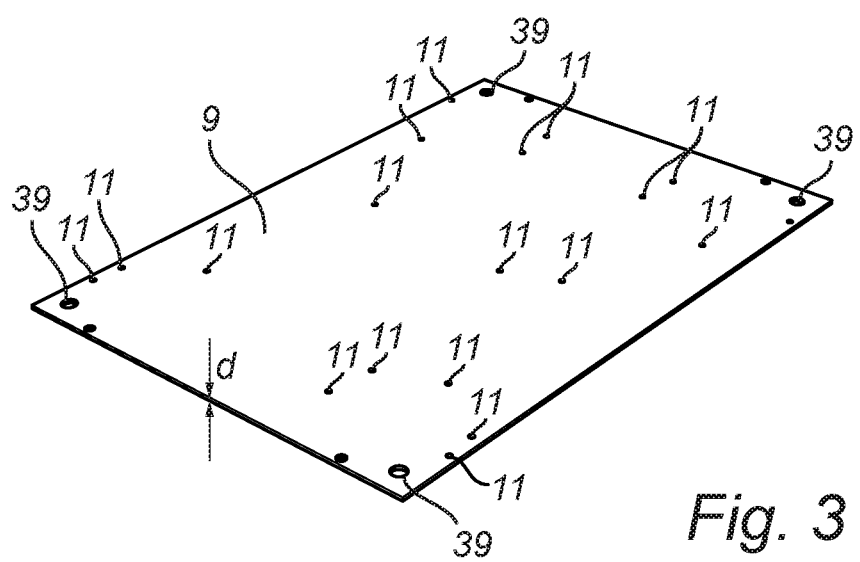
FIG. 3 conceptually illustrates a laser cut metallic support sheet according to embodiments of the invention.

FIG. 3 conceptually illustrates a laser cut metallic support sheet 9. The metallic support sheet may be made from a metallic sheet having thickness (d) of e.g. 3 mm, 4 mm, 5 mm, 6 mm, or 7 mm etc. The metallic support sheet 9 comprises a plurality of through holes 11 (having diameter of e.g. 5, mm, 6 mm, 7 mm, 8 mm, 9 mm, 10 mm) defining the layout for holder members 12 for holding vehicle component holders 14 or vehicle components measurement devices 16 (see e.g. FIG. 1). For example, one holder member 12 may be attached in one through-hole. The metallic support sheet 9 has outer dimensions such that the corner holes 39 matches the holes 33 of the corner reinforcement members 21 or corresponding mounting holes in the bottom support frame 7.

Figure 4A:
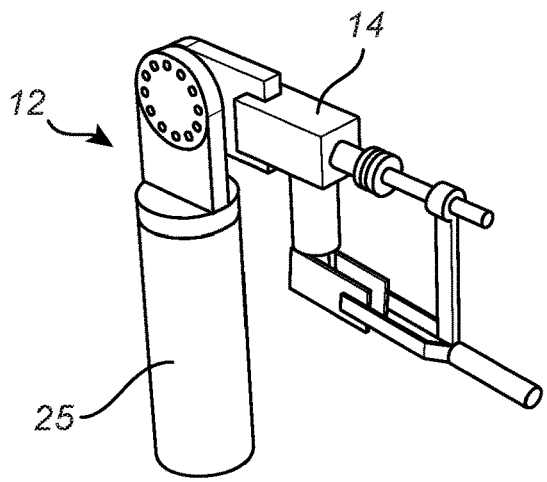
FIG. 4A conceptually illustrates a holder member having thereon an attached vehicle component holder.
Figure 4B:
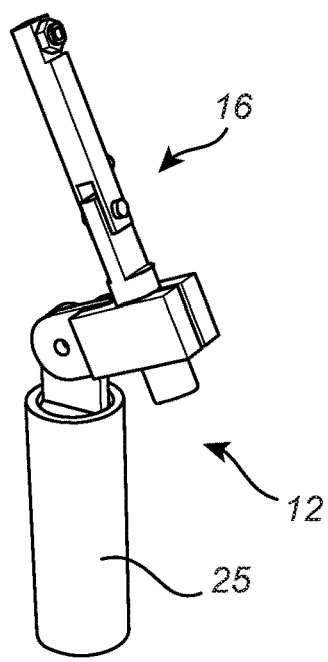
FIG. 4B conceptually illustrates a holder member having thereon an attached vehicle component measurement device.

FIG. 4A conceptually illustrates a holder member 12 having thereon an attached vehicle component holder 14. The holder member 12 comprises a pipe 25 onto which the vehicle component holder 14 is rotatable arranged. The rotatable connection may be provided by a bushing (not shown) arranged in the pipe 25. The pipe 25 may have outer dimension of about 30 mm, 35 mm, 40 mm, 45 mm, 50 mm, etc. and be made from a sheet steel material. Similarly, FIG. 4B conceptually illustrates a holder member 12 having thereon an attached vehicle components measurement devices 16. Such a measurement device 16 may include digital probe, measuring ruler (e.g. optical or mechanical), inclinometer, and any other measurement device known in the art used with checking fixtures.

Figure 5:
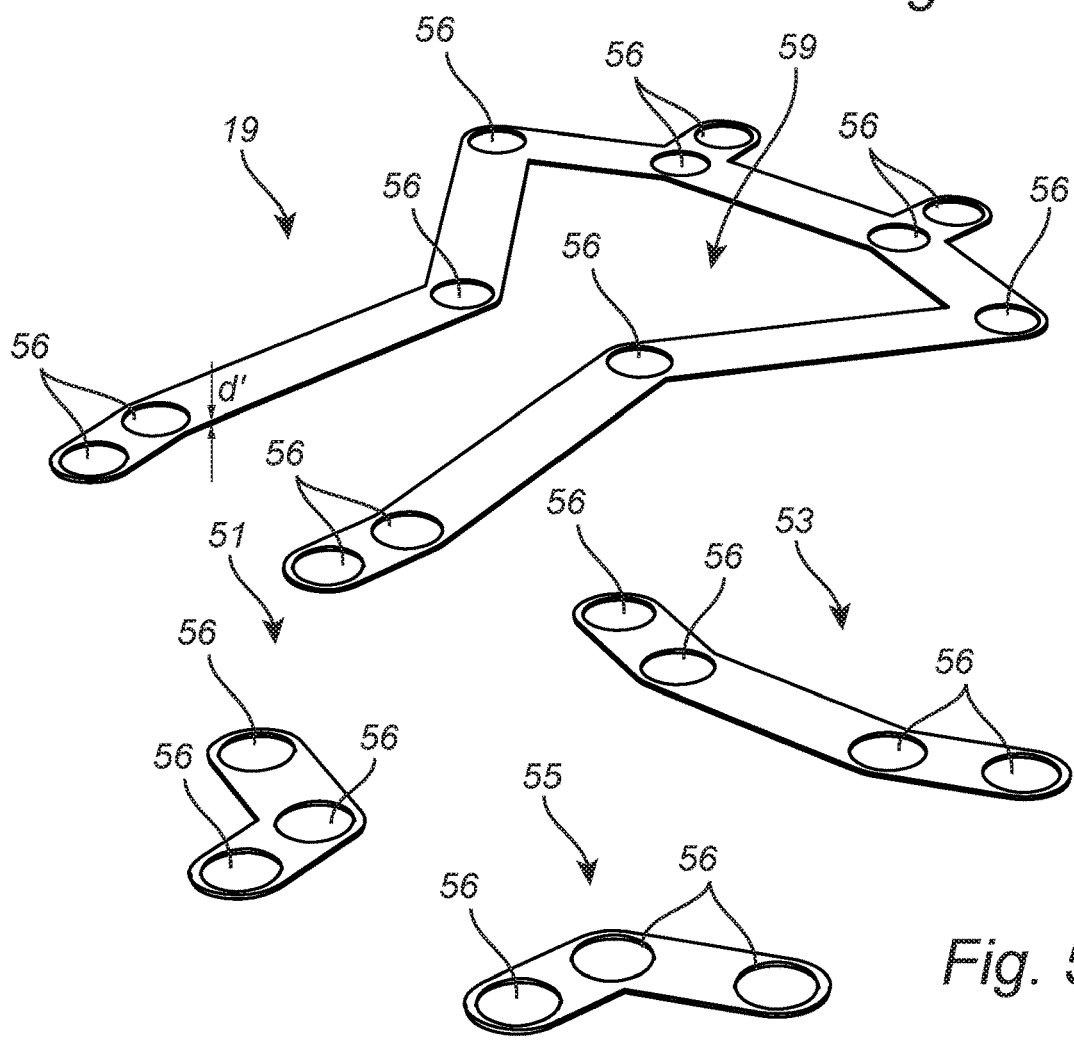
FIG. 5 conceptually illustrates laser cut metallic sheet reinforcement structures according to embodiments of the invention.

FIG. 5 conceptually illustrates metallic sheet reinforcement structures 19, 51, 53, 55. The metallic sheet reinforcement structures 19, 51, 53, 55 are made from laser cut metallic sheet material and comprises through-holes 56. The through holes 56 are arranged to match the locations of the holder members 12 attached to the through-holes of the metallic support sheet 9. When the metallic sheet reinforcement structures 19, 51, 53, 55 are mounted to the holder members 12 the relative locations of the holders members 12 are more rigidly fixated compared to only fixing their positions with the fastening to the through-holes of the metallic support sheet 9. The metallic sheet reinforcement structures 19, 51, 53, 55 are preferably arranged in a plane parallel with the plane of the metallic support sheet 9. The metallic sheet reinforcement structures 19, 51, 53, 55 may be made from a metallic sheet having thickness (d') of e.g. 3 mm, 4 mm, 5 mm, 6 mm, or 7 mm etc. The metallic sheet reinforcement structures 19, 51, 53, 55 are cut according to a predetermined path such as to remove a substantial part of the metallic sheet material, for example leaving relatively large openings 59 to reduce the weight of the metallic sheet reinforcement structures 19. Each metallic sheet reinforcement structures 19, 51, 53, 55 may be arranged to reinforce all of the holder members 12 or only a portion of the plurality of holder members 12. It should be understood that the metallic sheet reinforcement structures 19, 51, 53, 55 shown herein are exemplary layouts and that the layout of a metallic sheet reinforcement structure may be adapted to the specific vehicle component to the inspected in a specific checking fixture.

Figure 6A:
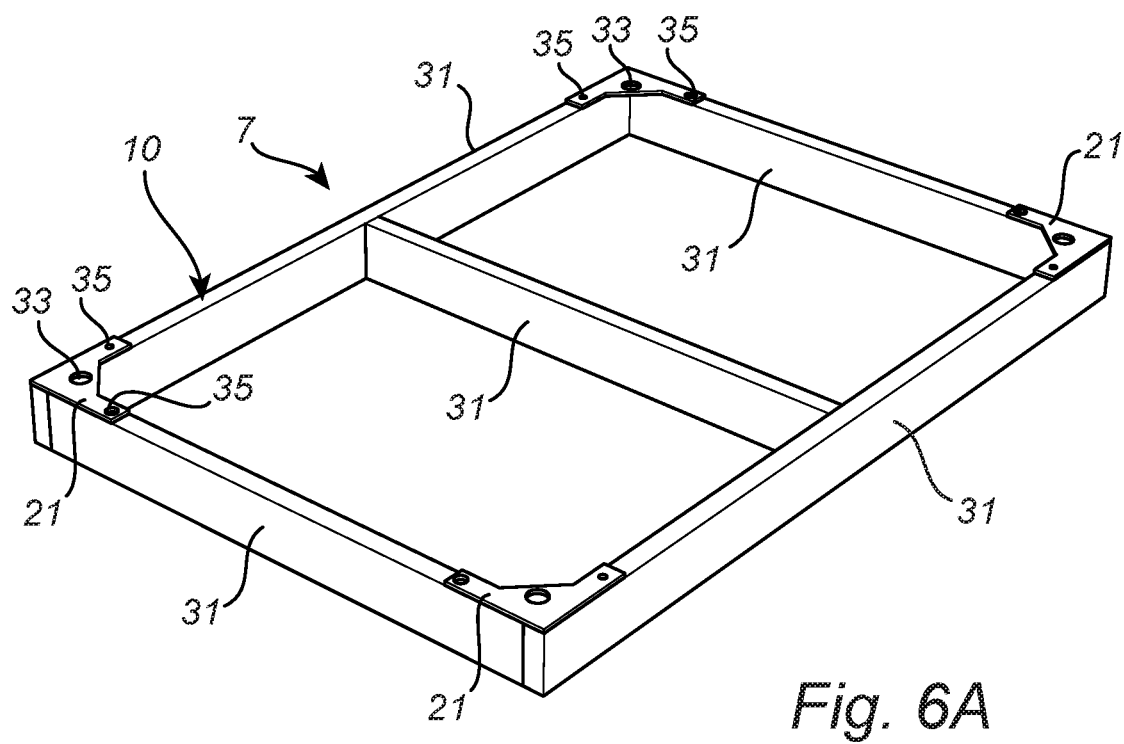
FIG. 6A-E conceptually illustrates assembling of a checking fixture according to an embodiment.
Figure 6B:
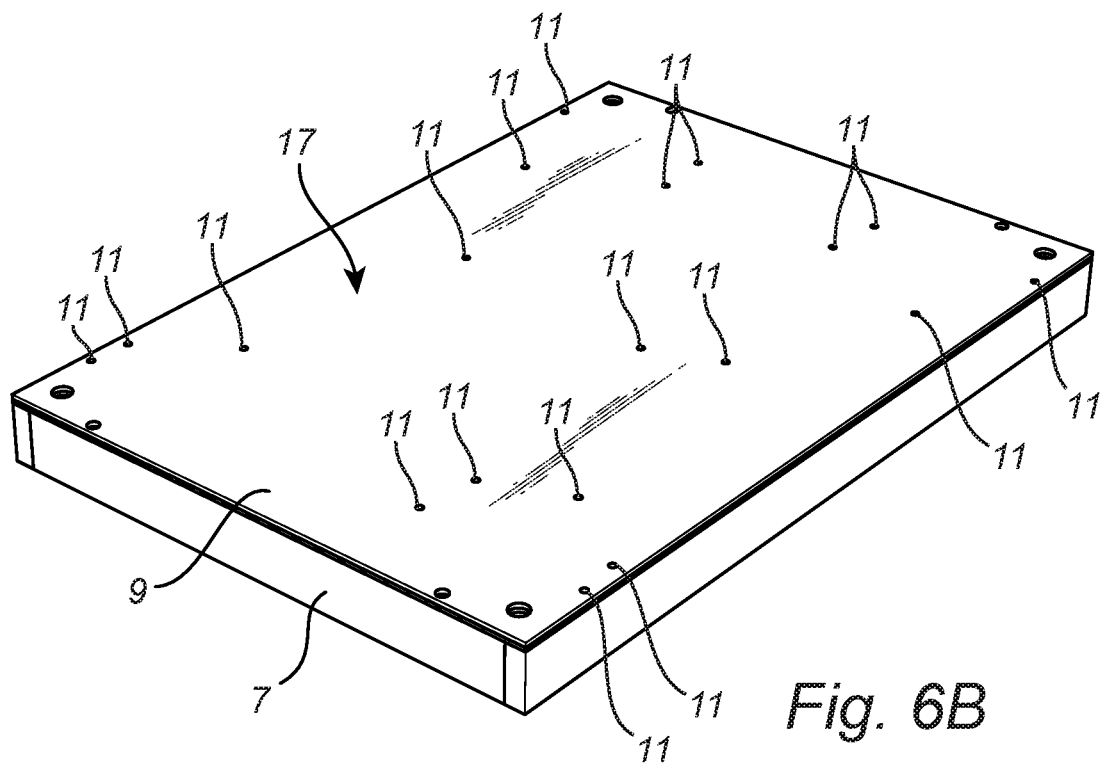
Figure 6C:
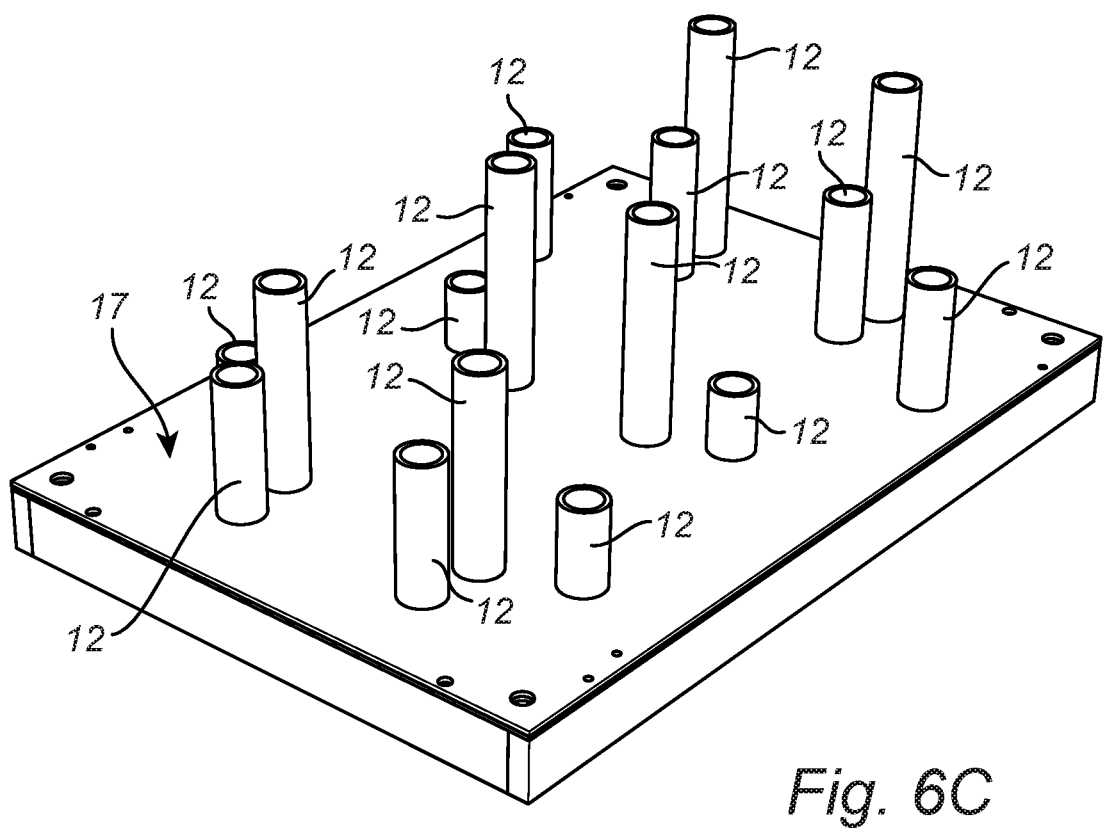
Figure 6D:
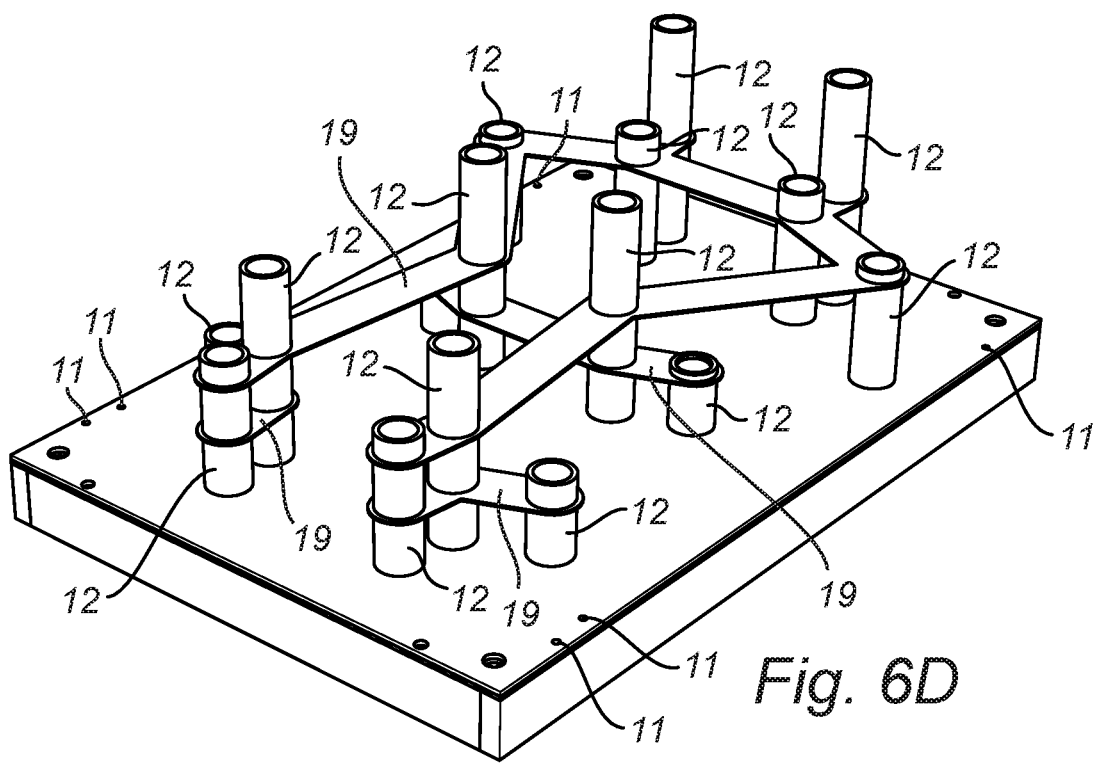
Figure 6E:
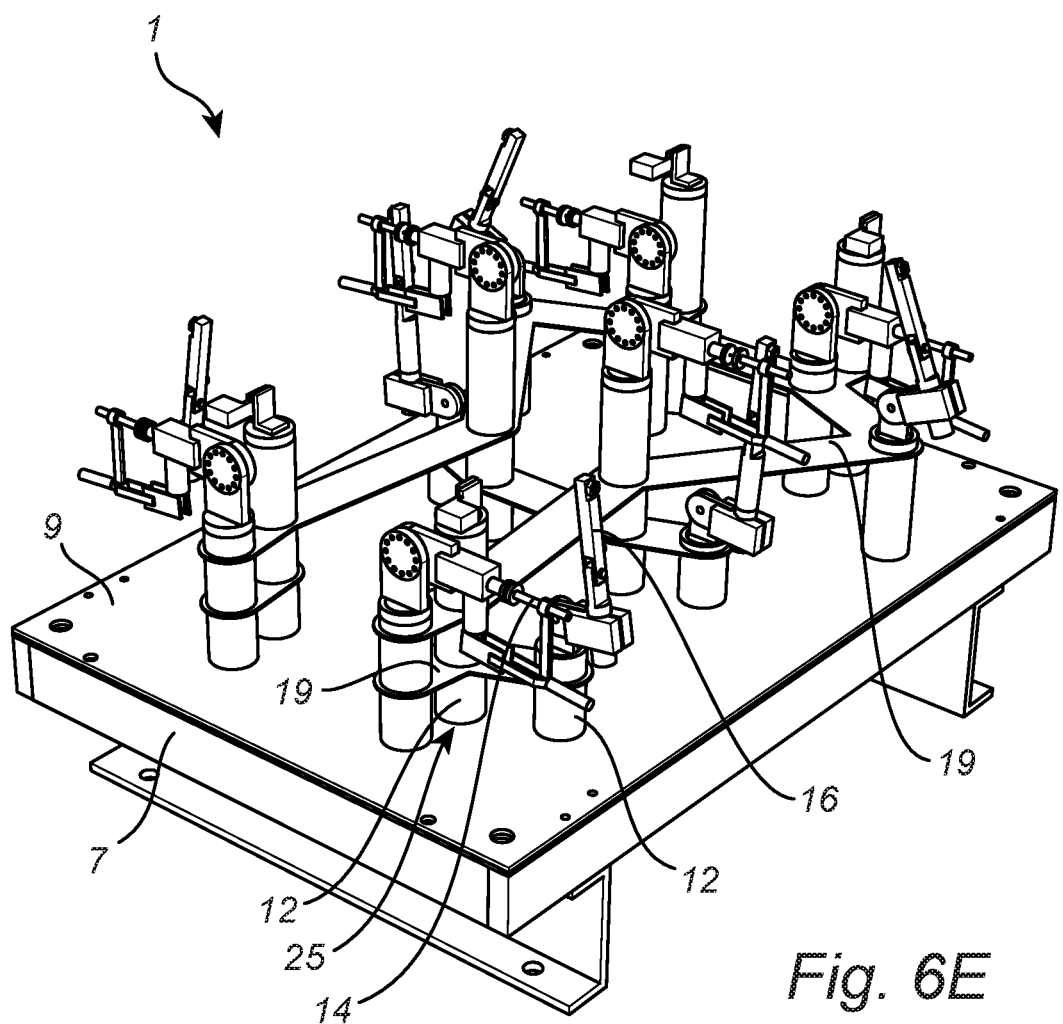
Figure 7:
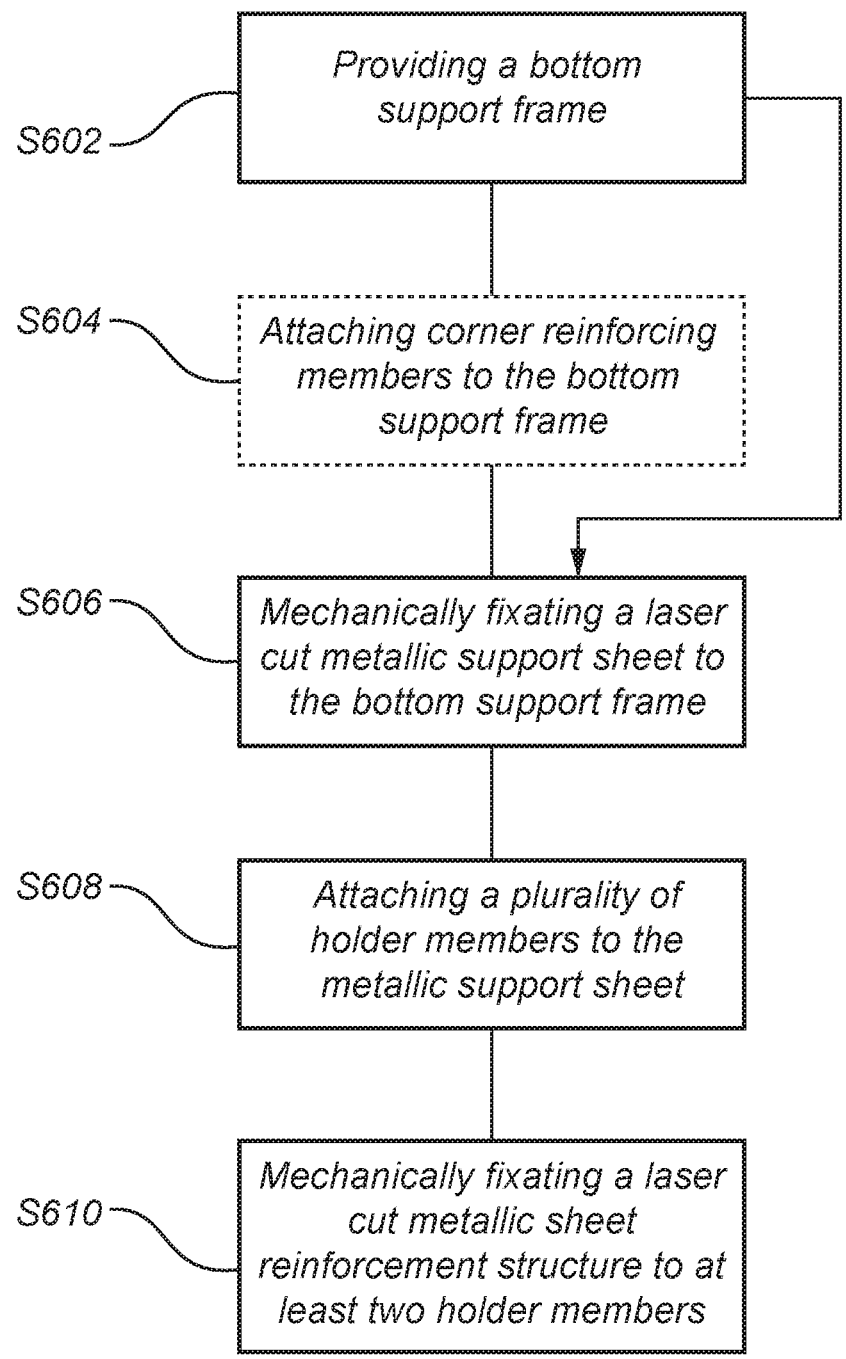
FIG. 7 is a flow chart of method steps according to embodiments of the invention.

FIG. 6A-6E conceptually illustrates assembly of a checking fixture according to an embodiment and FIG. 7 is a flow-chart of method steps shown in conjunction with FIG. 6A-6E. In a first step S602, a bottom support frame 7 is provided as is shown in FIG. 6A. Subsequently, a laser cut metallic support sheet 9 is mechanically fixated (S606) to the bottom support frame 7 (FIG. 6B). Optionally, corner reinforcement members 21 are attached (S604) at the corners of the bottom support frame 7 such that the metallic support sheet 9 may be attached to the bottom support frame via the corner reinforcement members 21. One corner reinforcement member 21 may be arranged in each of the corners of the bottom support frame 7 on the side 10 where the metallic support sheet 9 is to be attached. As shown in FIG. 6C a plurality of holder members 12 are attached S608 to the metallic support sheet 9 in the through-holes 11 of the metallic support sheet 9. The holder members 12 are arranged to extend away from an upper surface 17 of the metallic support sheet 9. Subsequently, a laser cut metallic reinforcement sheet structure is mechanically fixated S610 to at least two holder members to thereby fixate the relative position of the at least two holder members (See FIG. 6D). Vehicle component holders 14 or vehicle component measurement devices 16 may be attached to the holder members 12, see FIG. 6E. It should be noted that the metallic support sheet 9 and the metallic reinforcement sheet structure 19 are made by laser cutting a respective metallic sheet. Thus, a drawing of the desired pattern is loaded into a motion control system of a laser cutting machine which cuts the metallic sheet to the desired pattern, the pattern comprising for example the layout of the holes 11 in the metallic support sheet 9 or the outer shape or geometry of the metallic support sheet 9, or the geometry and/or holes or the metallic reinforcement sheet structure 19.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

What is claimed is:

1. A checking fixture for inspecting vehicle components for a vehicle, said fixture arrangement comprising:
    a bottom support frame;
    a metallic support sheet mechanically fixated to the bottom support frame, said metallic support sheet comprising a plurality of through holes arranged in a predetermined layout;
    a plurality of holder members for holding vehicle component holders or vehicle component measurement devices, said holder members being attached to the metallic support sheet in the through holes and being adapted to extend away from an upper surface of the metallic support sheet; and
    at least one metallic sheet reinforcement structure arranged orthogonally separated from the metallic support sheet, said metallic sheet reinforcement structure being adapted to fixate the relative position of at least two of said holder members,
    wherein, the metallic support sheet and the metallic reinforcement sheet structure are made from laser cut sheet material.

2. The checking fixture according to claim 1, comprising corner reinforcement members arranged in outer corners of the bottom support frame for mechanically reinforcing the bottom support frame, said corner reinforcement members comprising mounting holes (33), wherein said metallic support sheet is mechanically fixated to the bottom support frame at said mounting holes of the corner reinforcement members.

3. The checking fixture according to claim 2, wherein said corner reinforcement members are fixated to said bottom support frame by means of welding.

4. The checking fixture according to claim 1, wherein said holder members each comprises a pipe which is attached at a respective through hole of the metallic support sheet.

5. The checking fixture according to claim 1, wherein said bottom support frame comprises a plurality of metallic beams which are welded together to form said frame.

6. The checking fixture according to claim 1, wherein said metallic sheet reinforcement structure is welded to said holder members.

7. The checking fixture according to claim 1, wherein said metallic support sheet and said metallic sheet reinforcement structure are made from steel.

8. The checking fixture according to claim 1, wherein said metallic sheet reinforcement structure comprises through-holes, wherein each holder member is arranged in a respective through-hole of a metallic sheet reinforcement structure.

9. A method for manufacturing a checking fixture adapted for inspecting vehicle components for a vehicle, said method comprising:
    providing a bottom support frame;
    mechanically fixating a laser cut metallic support sheet to the bottom support frame, said metallic support sheet comprising a plurality of through holes arranged in a predetermined layout;
    attaching a plurality of holder members for holding vehicle component holders or vehicle component measurement devices to the metallic support sheet in the through holes such that the holder members extends away from an upper surface of the metallic support sheet; and
    mechanically fixating a laser cut metallic sheet reinforcement structure to at least two holder members for fixating the relative positions of the at least two holder members.

10. The method according to claim 9, comprising attaching corner reinforcing members to outer corners of said bottom support frame.

11. The method according to claim 10, comprising mechanically fixating the metallic support sheet to said corner reinforcement members.

12. The method according to claim 9, comprising:
    laser cutting a first metallic sheet to form said metallic support sheet.

13. The method according to claim 9, comprising:
    laser cutting a second metallic sheet to form said metallic sheet reinforcement structure.

14. The method according to claim 9, wherein said metallic support sheet and said metallic sheet reinforcement structure are made from steel.

15. The method according to claim 9, wherein said metallic sheet reinforcement structure comprises through-holes, wherein the method comprises:
    arranging said holder members in a respective though-hole of a metallic sheet reinforcement structure to fixate the relative positions of the holder members.

* * * * *